United States Patent [19]

Smiley

[11] Patent Number: 5,506,731
[45] Date of Patent: Apr. 9, 1996

[54] DEVICE FOR CONTROLLABLY MOVING AN OPTICAL ELEMENT

[75] Inventor: John O. Smiley, Ottawa, Canada

[73] Assignee: JDS Fitel Inc., Nepean, Canada

[21] Appl. No.: 349,191

[22] Filed: Dec. 5, 1994

[51] Int. Cl.[6] .............................. G02B 7/02; G02B 15/14
[52] U.S. Cl. .......................... 359/822; 359/813; 359/699; 359/823
[58] Field of Search .................................. 359/822, 823, 359/813, 814, 694, 699, 700, 701

[56] References Cited

U.S. PATENT DOCUMENTS

| | | | |
|---|---|---|---|
| 1,127,720 | 2/1915 | Baille-Lemaire | 359/822 |
| 3,630,131 | 12/1971 | Harvey | 354/148 |
| 3,675,565 | 7/1972 | Pagel | 354/148 |
| 3,963,306 | 6/1976 | Martin | 359/823 |
| 3,987,688 | 10/1976 | Tarbet | 356/319 |
| 4,717,222 | 1/1988 | Iwasaki | 359/212 |
| 4,889,613 | 12/1989 | McNeal | 204/416 |
| 4,911,542 | 3/1990 | Nishio | 359/701 |
| 5,054,886 | 10/1991 | Ozaki | 359/823 |
| 5,225,939 | 7/1993 | Iizuka | 359/699 |
| 5,244,455 | 9/1993 | Swicegood | 602/16 |
| 5,305,693 | 4/1994 | Johnson | 104/299 |

*Primary Examiner*—Georgia Y. Epps
*Assistant Examiner*—Ricky Mack
*Attorney, Agent, or Firm*—Neil Teitelbaum & Associates

[57] ABSTRACT

A device is provided for controllably moving an optical element such as an attenuator, into one of a plurality of positions. The device includes a rotatable, cylindrical member having a face cam that is an endless cammed surface for supporting and moving a cam follower. As the cammed surface is rotated, the cam follower resting upon it moves the optical element in a controlled manner. A gearing means in the form of a toothless planetary gear box is coupled to the cylindrical member and provides fine control over the range of movement of the device.

4 Claims, 3 Drawing Sheets

DEVICE FOR CONTROLLABLY MOVING AN OPTICAL ELEMENT

FIELD OF THE INVENTION

This invention relates generally to a device for moving an optical element and more particularly relates to a rotatable cam for actuating movement of an optical element.

BACKGROUND OF THE INVENTION

It is sometimes required in certain optical instruments and devices to move, rotate, or vary the position of optical elements, such as filters, mirrors, attenuators, and the like. The speed at which these elements are moved may not necessarily be of consequence, however, the precision or tolerance and range of movement are often critical factors. For example, some optical attenuators use a variable attenuation element such as neutral density filter that is required to be moved in a controlled manner through a beam of light, attenuating the beam, by transmitting a portion of it and absorbing or blocking the remaining portion. Means are present in a variety of commercially available optical attenuators for moving an optical element through a beam of light. For example, one such product is available from JDS FITEL Inc. of Ottawa, Ontario, Canada that uses a bearing mounted lead screw and nut that moves a linear filter through a collimated beam. Although this device is very precise it is costly and somewhat bulky; as well, the device cannot be easily, mass-produced. Another similar product uses an endless belt and capstan mechanism to reduce the cost of manufacturing, however less precision and reliability are obtained. Yet another commercially available device provides a space-saving, folding cavity with only one lens for both input and output optical signals. Although this device is compact and inexpensive its accuracy, range and reliability are limiting factors.

With an ever present focus on down-sizing optical products, the demand for smaller devices and components increases.

Although the devices described heretofore may adequately perform their intended functions, it is an object of this invention to provide a more compact, less expensive device that offers suitable precision and reliability, for varying the position of an optical element in a controlled manner.

SUMMARY OF THE INVENTION

In accordance with the invention there is provided, a device for controllably moving an optical element into one of a plurality of positions, the device comprising a base, a member having a cammed surface, said member being rotatably mounted to the base for rotational movement of said cammed surface relative to the base, and an optical element support member, said member movably mounted to the base such that a part of said member is in contact with said cammed surface, whereby, in operation, a rotating motion of said member with the cammed surface causes a controlled movement of said optical element support member.

In accordance with another aspect of the invention, a device is provided for controllably moving an element into one of a plurality of positions. The device comprises a housing; and, a rotatable member having a cammed surface, the cammed surface being an endless closed loop cam track and being rotatable while in the housing, the cammed surface for providing controlled movement of a cam follower resting upon it as the cammed surface is rotated in a controlled manner, the optical element being coupled to and moving with the cam follower.

BRIEF DESCRIPTION OF THE DRAWINGS

Exemplary embodiments of the invention will be described in conjunction with the drawings, in which.

DETAILED DESCRIPTION

Figure 1:
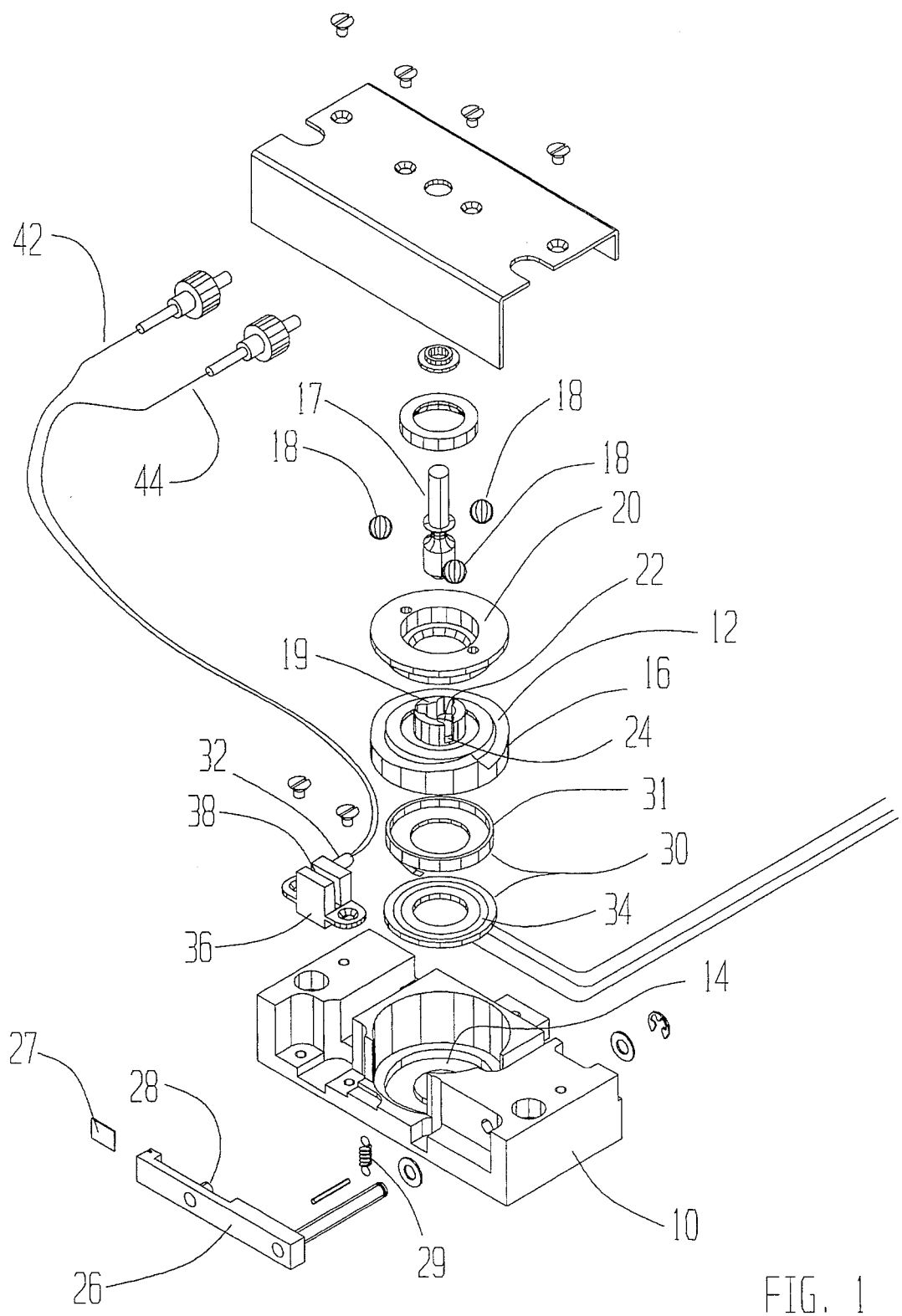
FIG. 1 is an exploded view of an optical attenuator in accordance with the invention.
Figure 2:
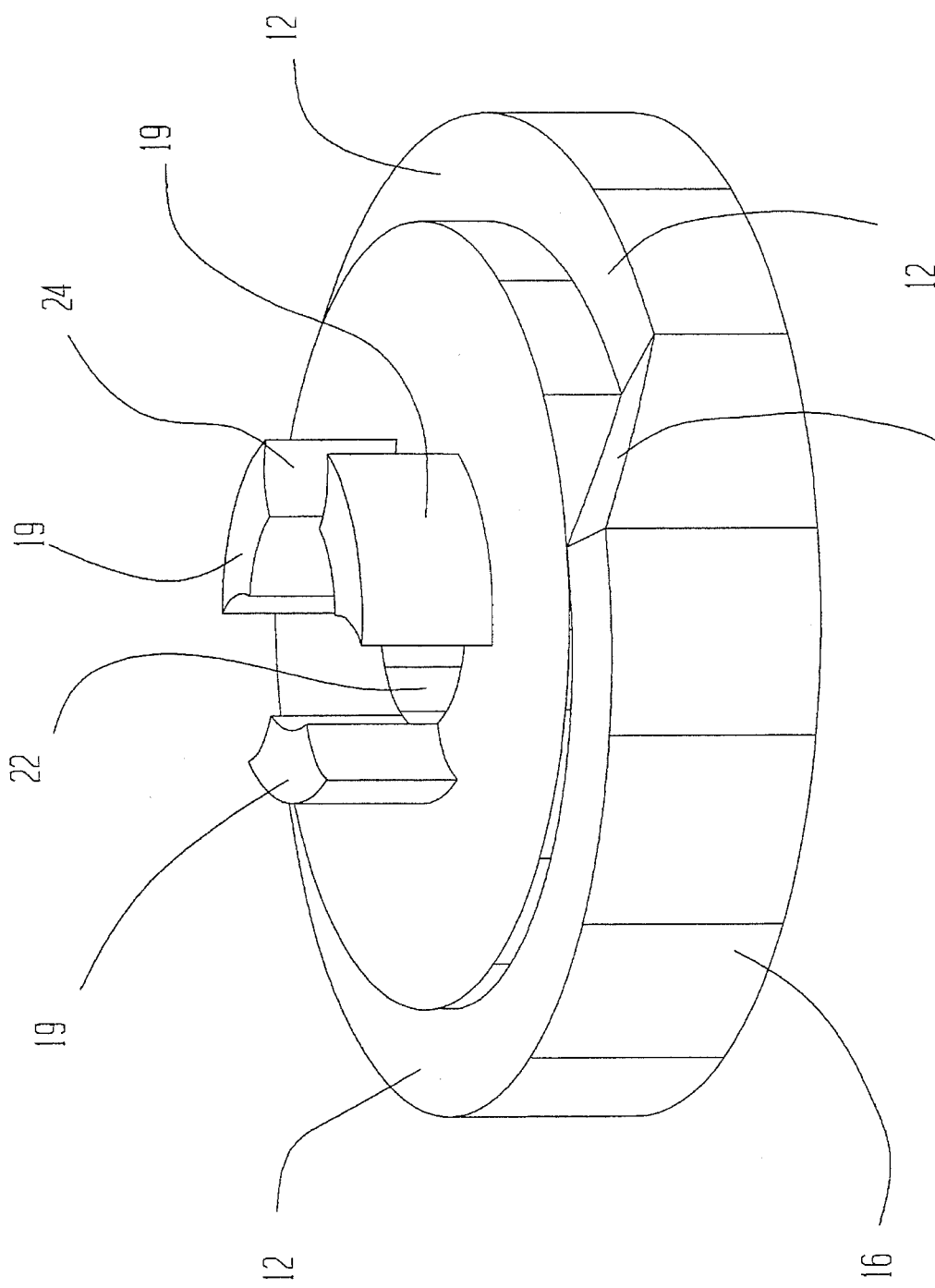
FIG. 2 is a perspective view of a cylindrical member having cammed upper surface shown in the exploded view of FIG. 1; and, FIG. 3 is a perspective view of a cylindrical member similar to that of FIG. 2 but having a worm drive.
Figure 3:
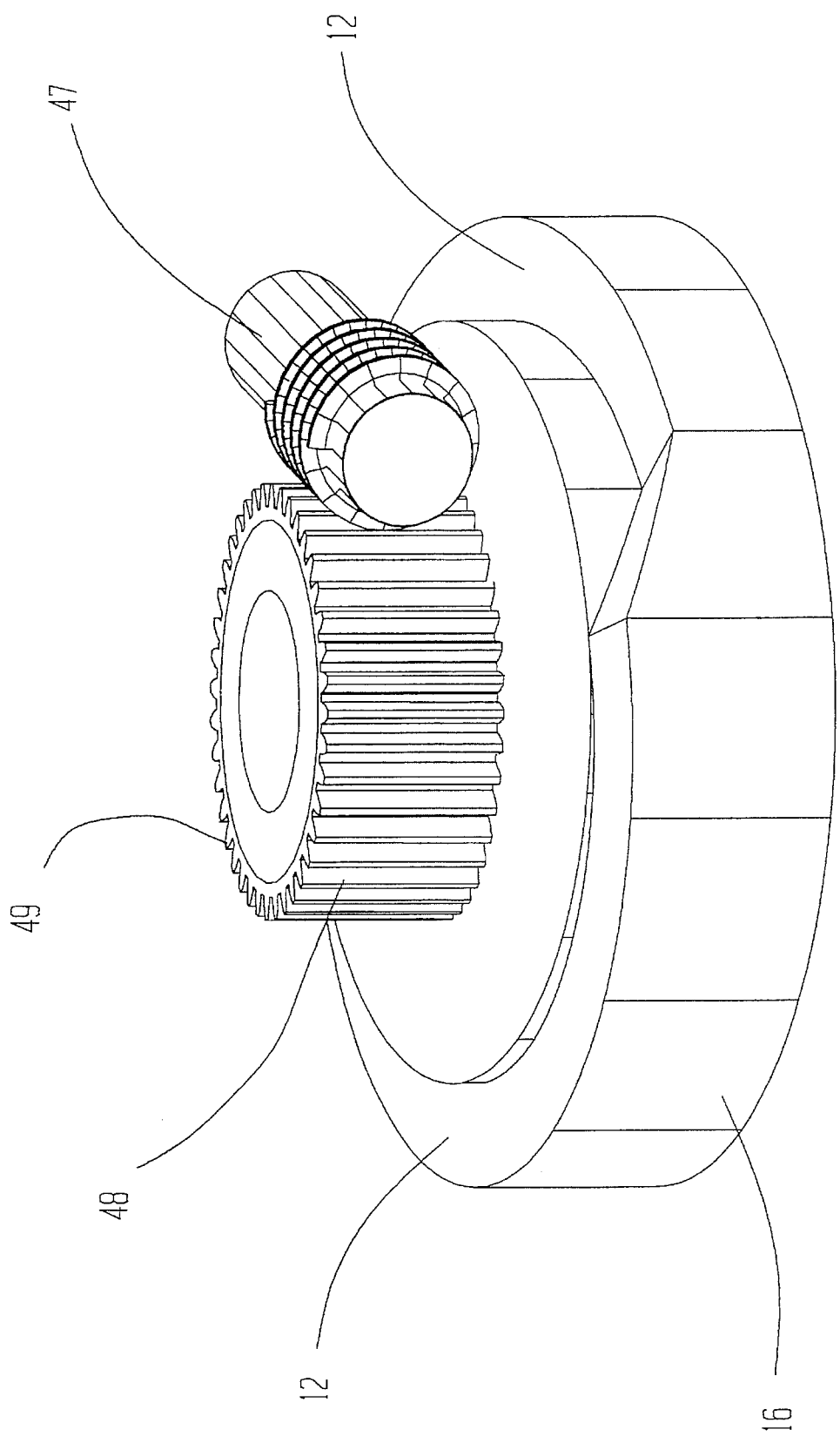

Referring now to the optical attenuator of FIG. 1 and FIG. 2, a machined base 10 serves as a housing for accommodating a plurality of precision-fitted components. A large opening 14 within the base houses a rotatable cylindrical member 16 having a face cam 12 defined on its upper end in the form of a modified helical surface; the member 16 also includes a bore 22 for accommodating a shalt 17 through the cylindrical member's 16 axis of rotation. A collar 19 surrounding the bore 22 projects from the face cam 12 with three slots 24 for containing and engaging three steel balls 18. The steel balls 18 are tightly but rotatably held in place between a shaft 24 and a drive housing 20, forming a ball-type reducer adapted to be coupled with the upper cammed surface of the cylindrical member 16. The ball reducer forms a toothless planetary gear box; as the shaft 17 rotates, the steel balls 18 rotate but lag behind the shalt 17. In the preferred embodiment shown, the ball-type reducer has a ratio of approximately 5:1 for increasing the number of turns required on the shalt and as thus increasing the precision of the attenuator. Of course other gearing means may be used; for example, the ball drive may be replaced with a worm drive as is shown in FIG. 3 where a threaded shaft 47 engages gear teeth 48 cut into the vertical face of a collar 49 above the cammed surface 12. Alternatively, the gear teeth could be located on the vertical outer surface of the cammed member 16.

Referring now, to FIG. 2, the face cam 12 is shown in detail as a rotatable closed-loop cam track providing an endless path on which a cam follower 28, shown in FIG. 1, is disposed. The face cam 12 has a ramped portion 13 that joins the highest and lowest points of the cammed surface, thereby forming the endless path. The cam follower 28 is located intermediate ends of an elongated biased arm 26; the arm 26 is pivotally mounted at one end for rotation about the base 10. An optical element in the form of a variable attenuating neutral density filter 27 is secured to the other end of the biased arm 26. A spring 29 normally biases the cam follower against the face cam 12.

A rotary potentiometer 30 provides a feedback signal relating to the position of the neutral density filter. The potentiometer 30 is located beneath and coupled with the cammed cylindrical member; it is comprised of upper and lower flat disk-like elements 31 and 34. Since the cammed cylindrical member 16 is linked to the neutral density filter through the cam follower 28, the potentiometer provides a means of indicating the relative position of the neutral density filter 27 by sensing the relative position of the cammed cylindrical member 16. Of course, calibration of the potentiometer relative to the position of the filter 27 is required. The lower disk-like element 34 of the potentiometer 30 includes conductive and resistive rings; the disk like-element 31 is fixed to the underside of the face cam 12 and rotates with it; The element 31 includes a wiper arm 32 that bridges the rings at particular locations, thereby varying the voltage output of the potentiometer 30 and providing the feedback signal. As the shaft 17 rotates, the wiper arm 32 sweeps across the rings serving as a commutator to transfer a voltage to a reference terminal. The very long travel circumference of the rotary potentiometer 30 substantially obviates problems of irregularity associated with shorter devices.

A guide and optical fiber holding means 36 is fastened to the base for holding two optical fibers 42 and 44. A slot defined in the guide 36 is provided to receive the neutral density filter 27. A mirror 38 is affixed to one side of the slot, and provides a folded cavity to economize space. In order to minimize interference etalon effects, the neutral density filter 27 is wedge shaped so that the planar faces of the glass substrate are not parallel and are tilted so that the receiving light from the optical fiber 42 is not strictly orthogonal to the end face of the optical fiber thereby reducing back reflections.

In operation, as a beam of light propagates along the optical fiber 42 from its source (not shown) through a collimator lens to the neutral density filter 27 and onward to the mirror 38, it is reflected back through the collimator to the second optical fiber 44. As the position of the neutral density filter 27 is varied, so is the amount of light transmitted through the filter 27, and thus the amount of light returning along optical fiber 44 is varied, increasing or decreasing in dependence upon the position of the filter 27 or the direction in which the shaft is turned. So, as the shaft 17 is manually rotated, the steel balls rotate, which in turn effect rotation of the face cam 12. The cam follower 28, riding on, and being supported by the face cam 12, lifts or lowers the arm 26 pivotally attached to the base depending upon the direction in which the shaft is rotated. As the arm 26 is pivoted about the base, its other end, having the filter 27 attached, is raised or lowered, following a nearly straight, but arcuate path. Since the cam follower 28 is in direct contact with the cam which is in direct contact with the potentiometer, only a single mechanical link having essentially no backlash error separates the attenuator element from the feedback device. The precision of the device is particularly dependent upon two variables; the smoothness of the cam surface and the precision with which the cammed cylindrical member 16 fits in its bore 22.

Of course, other embodiments of the invention may be envisaged without departing from the spirit and scope of this invention.

What I claim is:

1. A device for controllably moving an optical element into one of a plurality of positions, comprising a housing; and, a rotatable member having an outer cammed surface in the form of a face cam, the face cam having a ramped portion joining a highest and lowest point of the cammed surface thereby providing an endless closed loop cam track being continuously rotatable in at least one direction while in the housing, the outer cammed surface of the rotatable member provides controlled movement of a cam follower resting upon it as the outer cammed surface of the rotatable member is rotated in a controlled manner, the optical element being coupled to and moving with the cam follower.

2. A deuce for controllably moving an optical element into one of a plurality of positions, comprising a housing; and a rotatable member having a cammed surface, the cammed surface being an endless closed loop cam track and being rotatable while in the housing the cammed surface of the rotatable member provides controlled movement of a cam follower resting upon it as the cammed surface of the rotatable member is rotated in a controlled manner, the optical element being coupled to and moving with the cam follower, wherein the optical element is wedge shaped to substantially prevent etalon cavity effects within the optical element.

3. A device for controllably moving an optical element into one of a plurality of positions, comprising a housing: and, a rotatable member having a cammed surface, the cammed surface being an endless closed loop cam track and being rotatable while in the housing, the cammed surface of the rotatable member provides controlled movement of a cam follower resting upon it as the cammed surface of the rotatable member is rotated in a controlled manner, the optical element being coupled to and moving with the cam follower, and including potentiometer means operable for varying a current or a voltage as the rotatable cammed member is rotated from one position to another.

4. A device as defined in claim 3 wherein the potentiometer means includes a relatively movable wiper and conductive ring.

* * * * *